United States Patent
Shao et al.

(10) Patent No.: US 12,395,219 B2
(45) Date of Patent: Aug. 19, 2025

(54) SYSTEMS AND METHODS FOR ENHANCING CHANNEL MEASUREMENT CONFIGURATION

(71) Applicant: ZTE Corporation, Guangdong (CN)

(72) Inventors: Shijia Shao, Shenzhen (CN); Bo Gao, Shenzhen (CN); Shujuan Zhang, Shenzhen (CN); Ke Yao, Shenzhen (CN); Zhaohua Lu, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 70 days.

(21) Appl. No.: 18/490,459

(22) Filed: Oct. 19, 2023

(65) Prior Publication Data

US 2024/0072867 A1 Feb. 29, 2024

Related U.S. Application Data (63) Continuation of application No. PCT/CN2021/110801, filed on Aug. 5, 2021.

(51) Int. Cl.
*H04L 5/12* (2006.01)
*H04B 7/06* (2006.01)

(52) U.S. Cl.
CPC ......... *H04B 7/0626* (2013.01); *H04B 7/0639* (2013.01)

(58) Field of Classification Search
CPC ... H04B 7/0626; H04B 7/0639; H04L 1/0026; H04L 5/0048; H04L 5/0051; H04L 27/2647; H04L 5/0094; H04L 5/0057
USPC ....................................................... 375/262
See application file for complete search history.

(56) References Cited

U.S. PATENT DOCUMENTS

| | | | | |
|---|---|---|---|---|
| 2020/0259683 | A1* | 8/2020 | Manolakos | H04L 5/0053 |
| 2021/0028823 | A1* | 1/2021 | Park | H04W 80/02 |
| 2021/0058125 | A1* | 2/2021 | Manolakos | H04B 7/0626 |

FOREIGN PATENT DOCUMENTS

| | | |
|---|---|---|
| CN | 110971382 A | 4/2020 |
| CN | 111162826 A | 5/2020 |
| EP | 4 106 219 A1 | 12/2022 |

OTHER PUBLICATIONS

International Search Report and Written Opinion for PCT Appl. No.PCT/CN2021/0110801, mailed Apr. 25, 2022 (7 pages).
ZTE, "CSI enhancements for Multi-TRP and FR1 FDD reciprocity" 3GPP TSG RAN WG1 #104-e, R1-2100291, Feb. 5, 2021, e-Meeting (15 pages).
Extended European Search Report for EP Appl. No. 21952291.9, dated Apr. 25, 2024 (8 pages).
Huawei et al., "Discussion on CSI Enhancements for Rel-17", 3GPP TSG RAN WG1 #105-e, R1-2104270, May 27, 2021, e-Meeting (24 pages).

(Continued)

*Primary Examiner* — Helene E Tayong
(74) *Attorney, Agent, or Firm* — Foley & Lardner LLP (57) ABSTRACT

A wireless communication method includes identifying, by a wireless communication device, a number (N) of resource sets in a resource setting, wherein N is equal to or greater than 2; and determining, by the wireless communication device, a number (OCPU) of processing units being occupied over a plurality of symbols, wherein the occupied process units are configured for processing a Channel State Information (CSI) report.

20 Claims, 6 Drawing Sheets

(56) References Cited

OTHER PUBLICATIONS

Intel Corporation, "On CSI enhancements for MTRP and FDD", 3GPP TSG RAN WG1 #104b-e, R1-2103020, Apr. 20, 2021, e-Meeting (9 pages).
Lenovo et al., "CSI enhancements for multi-TRP and FDD reciprocity", 3GPP TSG RAN WG1 #105-e, R1-2105762, May 27, 2021, e-Meeting (18 pages).
Nokia et al., "Enhancement on CSI measurement and reporting", 3GPP TSG RAN Meeting #105-e, R1-2105277, May 27, 2021, e-Meeting (26 pages).
Samsung, "Views on Rel-17 CSI enhancements", 3GPP TSG RAN WG1#105-e, R1-2105295, May 27, 2021, e-Meeting (25 pages).
Spreadtrum Communications, "Discussion on CSI enhancement for multi-TRP and FR1 FDD reciprocity", 3GPP TSG RAN WG1 #105-e, R1-2104415, May 27, 2021, e-Meeting (9 pages).
Vivo, "Further discussion and evaluation on Multi-TRP CSI and partial reciprocity", 3GPP TSG RAN WG1 #105-e, R1-2104347, May 27, 2021, e-Meeting (34 pages).

\* cited by examiner

SYSTEMS AND METHODS FOR ENHANCING CHANNEL MEASUREMENT CONFIGURATION

CROSS-REFERENCE TO RELATED APPLICATION

This application claims the benefit of priority under 35 U.S.C. § 120 as a continuation of PCT Patent Application No. PCT/CN2021/110801, filed on Aug. 5, 2021, the disclosure of which is incorporated herein by reference in its entirety.

TECHNICAL FIELD

The disclosure relates generally to wireless communications and, more particularly, to systems and methods for enhancing channel measurement configuration.

BACKGROUND

The standardization organization Third Generation Partnership Project (3GPP) is currently in the process of specifying a new Radio Interface called 5G New Radio (5G NR) as well as a Next Generation Packet Core Network (NG-CN or NGC). The 5G NR will have three main components: a 5G Access Network (5G-AN), a 5G Core Network (5GC), and a User Equipment (UE). In order to facilitate the enablement of different data services and requirements, the elements of the 5GC, also called Network Functions, have been simplified with some of them being software based so that they could be adapted according to need.

SUMMARY

The example embodiments disclosed herein are directed to solving the issues relating to one or more of the problems presented in the prior art, as well as providing additional features that will become readily apparent by reference to the following detailed description when taken in conjunction with the accompany drawings. In accordance with various embodiments, example systems, methods, devices and computer program products are disclosed herein. It is understood, however, that these embodiments are presented by way of example and are not limiting, and it will be apparent to those of ordinary skill in the art who read the present disclosure that various modifications to the disclosed embodiments can be made while remaining within the scope of this disclosure.

In some arrangements, a User Equipment (UE) performs a method including identifying a number (N) of resource sets in a resource setting, wherein N is equal to or greater than 2; and determining a number ($O_{CPU}$) of processing units being occupied over a plurality of symbols, wherein the occupied process units are configured for processing a Channel State Information (CSI) report. In other arrangements, a Base Station (BS) performs a method including configuring a number (N) of resource sets in a resource setting, wherein N is equal to or greater than 2; and receiving, from a UE, a Channel State Information (CSI) report, wherein the CSI report is processed by a number ($O_{CPU}$) of processing units being occupied over a plurality of symbols. In yet other embodiments, a wireless communications apparatus comprises a processor and a memory, wherein the processor is configured to read code from the memory and implement a method including identifying a number (N) of resource sets in a resource setting, wherein N is equal to or greater than 2; and determining a number ($O_{CPU}$) of processing units being occupied over a plurality of symbols, wherein the occupied process units are configured for processing a Channel State Information (CSI) report. In further embodiments, a computer program product comprises a computer-readable program medium code stored thereupon, the code, when executed by a processor, causing the processor to implement a method including identifying a number (N) of resource sets in a resource setting, wherein N is equal to or greater than 2; and determining a number ($O_{CPU}$) of processing units being occupied over a plurality of symbols, wherein the occupied process units are configured for processing a Channel State Information (CSI) report.

The above and other aspects and their implementations are described in greater detail in the drawings, the descriptions, and the claims.

BRIEF DESCRIPTION OF THE DRAWINGS

Various example embodiments of the present solution are described in detail below with reference to the following figures or drawings. The drawings are provided for purposes of illustration only and merely depict example embodiments of the present solution to facilitate the reader's understanding of the present solution. Therefore, the drawings should not be considered limiting of the breadth, scope, or applicability of the present solution. It should be noted that for clarity and ease of illustration, these drawings are not necessarily drawn to scale.

DETAILED DESCRIPTION

Figure 1:
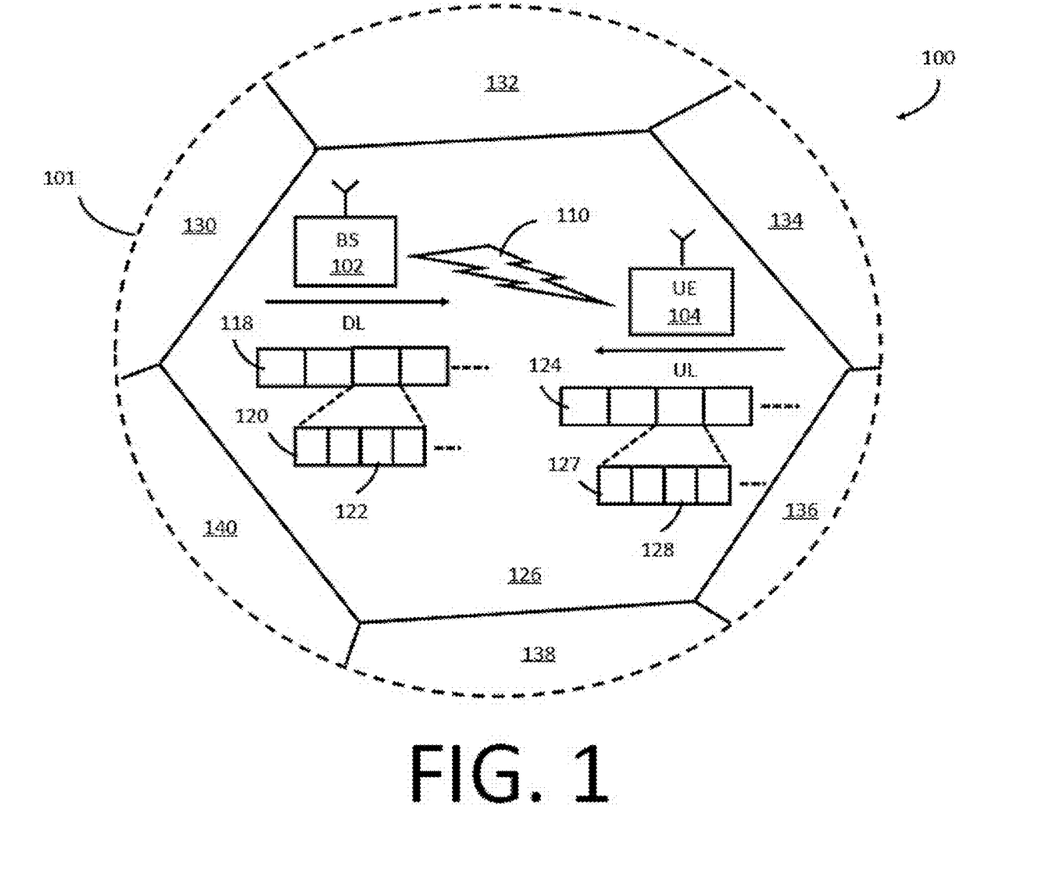
FIG. 1 is an example cellular communication network in which techniques disclosed herein may be implemented, according to various embodiments.

FIG. 1 illustrates an example wireless communication network, and/or system, 100 in which techniques disclosed herein may be implemented, in accordance with an embodiment of the present disclosure. In the following discussion, the wireless communication network 100 may be any wireless network, such as a cellular network or a narrowband Internet of things (NB-IoT) network, and is herein referred to as "network 100." Such an example network 100 includes a base station 102 (hereinafter "BS 102"; also referred to as wireless communication node) and a user equipment device 104 (hereinafter "UE 104"; also referred to as wireless communication device) that can communicate with each other via a communication link 110 (e.g., a wireless communication channel), and a cluster of cells 126, 130, 132, 134, 136, 138 and 140 overlaying a geographical area 101. In FIG. 1, the BS 102 and UE 104 are contained within a respective geographic boundary of cell 126. Each of the other cells 130, 132, 134, 136, 138 and 140 may include at least one base station operating at its allocated bandwidth to provide adequate radio coverage to its intended users.

For example, the BS 102 may operate at an allocated channel transmission bandwidth to provide adequate coverage to the UE 104. The BS 102 and the UE 104 may communicate via a downlink radio frame 118, and an uplink radio frame 124 respectively. Each radio frame 118/124 may be further divided into sub-frames 120/127 which may include data symbols 122/128. In the present disclosure, the BS 102 and UE 104 are described herein as non-limiting examples of "communication nodes," generally, which can practice the methods disclosed herein. Such communication nodes may be capable of wireless and/or wired communications, in accordance with various embodiments of the present solution.

Figure 2:
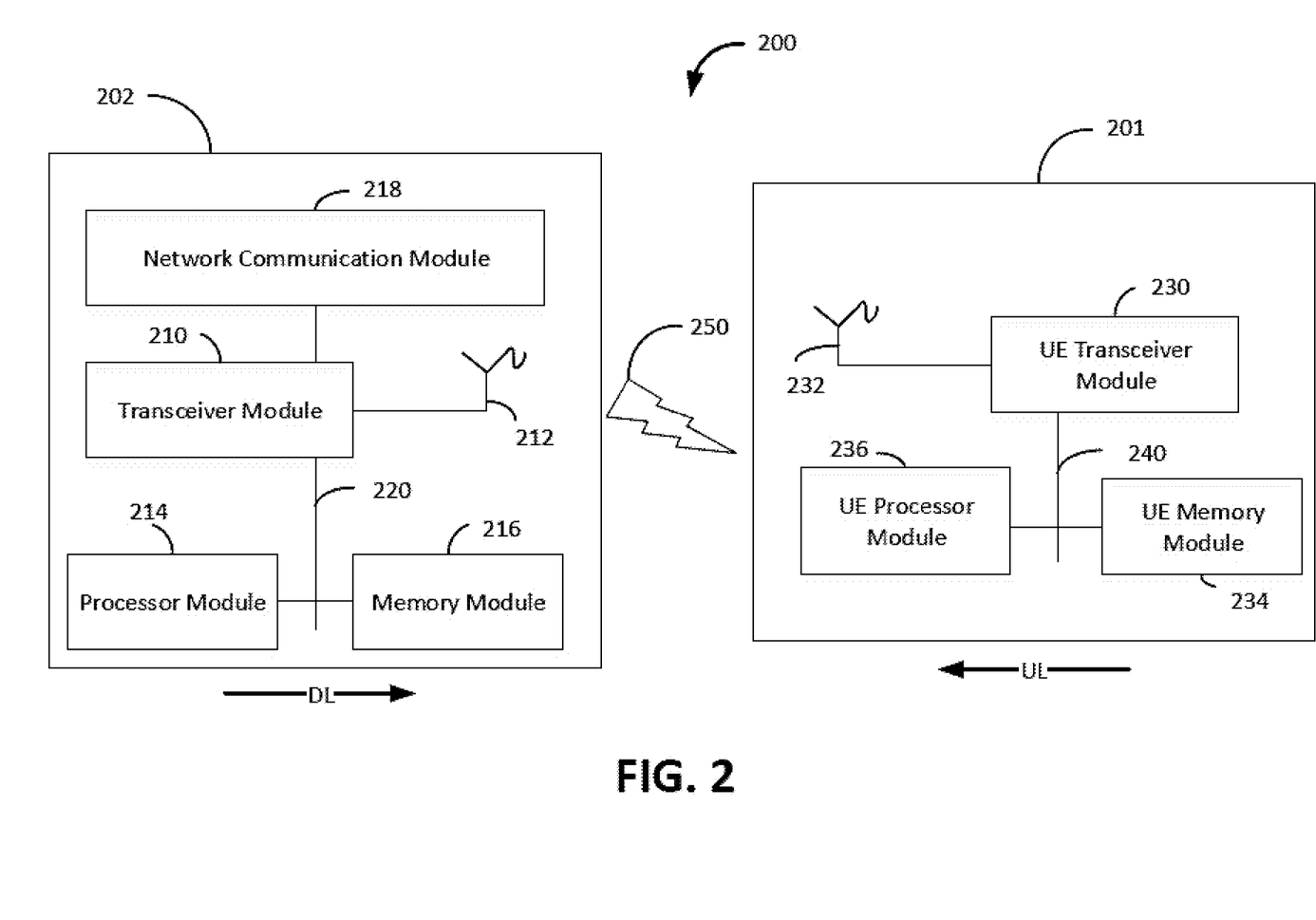
FIG. 2 illustrates a block diagram of an example base station and a user equipment device, according to various embodiments.

FIG. 2 illustrates a block diagram of an example wireless communication system 200 for transmitting and receiving wireless communication signals (e.g., OFDM/OFDMA signals) in accordance with some embodiments of the present solution. The system 200 may include components and elements configured to support known or conventional operating features that need not be described in detail herein. In one illustrative embodiment, system 200 can be used to communicate (e.g., transmit and receive) data symbols in a wireless communication environment such as the wireless communication environment 100 of FIG. 1, as described above.

System 200 generally includes a base station 202 (hereinafter "BS 202") and a user equipment device 204 (hereinafter "UE 204"). The BS 202 includes a BS (base station) transceiver module 210, a BS antenna 212, a BS processor module 214, a BS memory module 216, and a network communication module 218, each module being coupled and interconnected with one another as necessary via a data communication bus 220. The UE 204 includes a UE (user equipment) transceiver module 230, a UE antenna 232, a UE memory module 234, and a UE processor module 236, each module being coupled and interconnected with one another as necessary via a data communication bus 240. The BS 202 communicates with the UE 204 via a communication channel 250, which can be any wireless channel or other medium suitable for transmission of data as described herein.

As would be understood by persons of ordinary skill in the art, system 200 may further include any number of modules other than the modules shown in FIG. 2. Those skilled in the art will understand that the various illustrative blocks, modules, circuits, and processing logic described in connection with the embodiments disclosed herein may be implemented in hardware, computer-readable software, firmware, or any practical combination thereof. To clearly illustrate this interchangeability and compatibility of hardware, firmware, and software, various illustrative components, blocks, modules, circuits, and steps are described generally in terms of their functionality. Whether such functionality is implemented as hardware, firmware, or software can depend upon the particular application and design constraints imposed on the overall system. Those familiar with the concepts described herein may implement such functionality in a suitable manner for each particular application, but such implementation decisions should not be interpreted as limiting the scope of the present disclosure In accordance with some embodiments, the UE transceiver 230 may be referred to herein as an "uplink" transceiver 230 that includes a radio frequency (RF) transmitter and a RF receiver each comprising circuitry that is coupled to the antenna 232. A duplex switch (not shown) may alternatively couple the uplink transmitter or receiver to the uplink antenna in time duplex fashion. Similarly, in accordance with some embodiments, the BS transceiver 210 may be referred to herein as a "downlink" transceiver 210 that includes a RF transmitter and a RF receiver each comprising circuitry that is coupled to the antenna 212. A downlink duplex switch may alternatively couple the downlink transmitter or receiver to the downlink antenna 212 in time duplex fashion. The operations of the two transceiver modules 210 and 230 may be coordinated in time such that the uplink receiver circuitry is coupled to the uplink antenna 232 for reception of transmissions over the wireless transmission link 250 at the same time that the downlink transmitter is coupled to the downlink antenna 212. Conversely, the operations of the two transceivers 210 and 230 may be coordinated in time such that the downlink receiver is coupled to the downlink antenna 212 for reception of transmissions over the wireless transmission link 250 at the same time that the uplink transmitter is coupled to the uplink antenna 232. In some embodiments, there is close time synchronization with a minimal guard time between changes in duplex direction.

The UE transceiver 230 and the base station transceiver 210 are configured to communicate via the wireless data communication link 250, and cooperate with a suitably configured RF antenna arrangement 212/232 that can support a particular wireless communication protocol and modulation scheme. In some illustrative embodiments, the UE transceiver 210 and the base station transceiver 210 are configured to support industry standards such as the Long Term Evolution (LTE) and emerging 5G standards, and the like. It is understood, however, that the present disclosure is not necessarily limited in application to a particular standard and associated protocols. Rather, the UE transceiver 230 and the base station transceiver 210 may be configured to support alternate, or additional, wireless data communication protocols, including future standards or variations thereof.

In accordance with various embodiments, the BS 202 may be an evolved node B (eNB), a serving eNB, a target eNB, a femto station, or a pico station, for example. In some embodiments, the UE 204 may be embodied in various types of user devices such as a mobile phone, a smart phone, a personal digital assistant (PDA), tablet, laptop computer, wearable computing device, etc. The processor modules 214 and 236 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

Furthermore, the steps of a method or algorithm described in connection with the embodiments disclosed herein may be embodied directly in hardware, in firmware, in a software module executed by processor modules 214 and 236, respectively, or in any practical combination thereof. The memory modules 216 and 234 may be realized as RAM memory, flash memory, ROM memory, EPROM memory, EEPROM memory, registers, a hard disk, a removable disk, a CD-ROM, or any other form of storage medium known in the art. In this regard, memory modules 216 and 234 may be coupled to the processor modules 210 and 230, respectively, such that the processors modules 210 and 230 can read information from, and write information to, memory modules 216 and 234, respectively. The memory modules 216 and 234 may also be integrated into their respective processor modules 210 and 230. In some embodiments, the memory modules 216 and 234 may each include a cache memory for storing temporary variables or other intermediate information during execution of instructions to be executed by processor modules 210 and 230, respectively. Memory modules 216 and 234 may also each include non-volatile memory for storing instructions to be executed by the processor modules 210 and 230, respectively.

The network communication module 218 generally represents the hardware, software, firmware, processing logic, and/or other components of the base station 202 that enable bi-directional communication between base station transceiver 210 and other network components and communication nodes configured to communication with the base station 202. For example, network communication module 218 may be configured to support internet or WiMAX traffic. In a typical deployment, without limitation, network communication module 218 provides an 802.3 Ethernet interface such that base station transceiver 210 can communicate with a conventional Ethernet based computer network. In this manner, the network communication module 218 may include a physical interface for connection to the computer network (e.g., Mobile Switching Center (MSC)). The terms "configured for," "configured to" and conjugations thereof, as used herein with respect to a specified operation or function, refer to a device, component, circuit, structure, machine, signal, etc., that is physically constructed, programmed, formatted and/or arranged to perform the specified operation or function.

The Open Systems Interconnection (OSI) Model (referred to herein as, "open system interconnection model") is a conceptual and logical layout that defines network communication used by systems (e.g., wireless communication device, wireless communication node) open to interconnection and communication with other systems. The model is broken into seven subcomponents, or layers, each of which represents a conceptual collection of services provided to the layers above and below it. The OSI Model also defines a logical network and effectively describes computer packet transfer by using different layer protocols. The OSI Model may also be referred to as the seven-layer OSI Model or the seven-layer model. In some embodiments, a first layer may be a physical layer. In some embodiments, a second layer may be a Medium Access Control (MAC) layer. In some embodiments, a third layer may be a Radio Link Control (RLC) layer. In some embodiments, a fourth layer may be a Packet Data Convergence Protocol (PDCP) layer. In some embodiments, a fifth layer may be a Radio Resource Control (RRC) layer. In some embodiments, a sixth layer may be a Non Access Stratum (NAS) layer or an Internet Protocol (IP) layer, and the seventh layer being the other layer.

Various example embodiments of the present solution are described below with reference to the accompanying figures to enable a person of ordinary skill in the art to make and use the present solution. As would be apparent to those of ordinary skill in the art, after reading the present disclosure, various changes or modifications to the examples described herein can be made without departing from the scope of the present solution. Thus, the present solution is not limited to the example embodiments and applications described and illustrated herein. Additionally, the specific order or hierarchy of steps in the methods disclosed herein are merely example approaches. Based upon design preferences, the specific order or hierarchy of steps of the disclosed methods or processes can be re-arranged while remaining within the scope of the present solution. Thus, those of ordinary skill in the art will understand that the methods and techniques disclosed herein present various steps or acts in a sample order, and the present solution is not limited to the specific order or hierarchy presented unless expressly stated otherwise.

In current 5G New Radio (NR) positioning systems, Multi-Transmission and Reception Point (MTRP) technology has become an important technical method in order to improve coverage at the cell edge and reduce the negative impact of the blocking effect. With the gradual standardization of MTRP technology, the enhancement of Downlink (DL) transmission is gradually stable, but the enhancement of Uplink (UL) transmission is insufficient. Particularly when a UE has the capability for multi-panel transmission, Channel State Information (CSI) feedback solutions and group-based reporting in beam management should be further considered.

A MTRP approach uses multiple Transmission and Reception Points (TRPs) to effectively improve the transmission throughput in the Long Term Evolution (LTE), LTE-Advanced (LTE-A), and NR access technology in an Enhanced Mobile Broadband (eMBB) scenario. At the same time, the use of MTRP transmission or reception can effectively reduce the probability of information blockage and improve the transmission reliability in Ultra-Reliability and Low Latency Communication (URLLC) scenarios. According to the mapping relationship between the transmitted signal flow and multi-TRP/panel, a Coordinated Multiple Points Transmission/Reception can be divided into two types: a) coherent transmission; and b) non-related transmission.

For coherent transmission, each data layer is mapped to multi-TRP/panel through weighted vectors. However, in an actual deployment environment, this mode has higher requirements for synchronization between TRPs and the transmission capability of backhaul links and is sensitive to many non-ideal factors. In comparison, Non-Coherent Joint Transmission (NCJT) is less affected by the above factors. In NCJT, each data flow is only mapped to a port corresponding to the TRP/panel with the same channel large-scale parameters (e.g., Quasi-Collocation (QCL)). Different data flows can be mapped to different ports with different large-scale parameters, and all TRPs do not need to be processed as a virtual array. For beam measurement in MTRP simultaneous transmission, the UE can report a single CSI-report consisting of N beam pairs/groups and M beams per pair/group (with M>1), and different beams within a pair/group can be received simultaneously.

Figure 3:
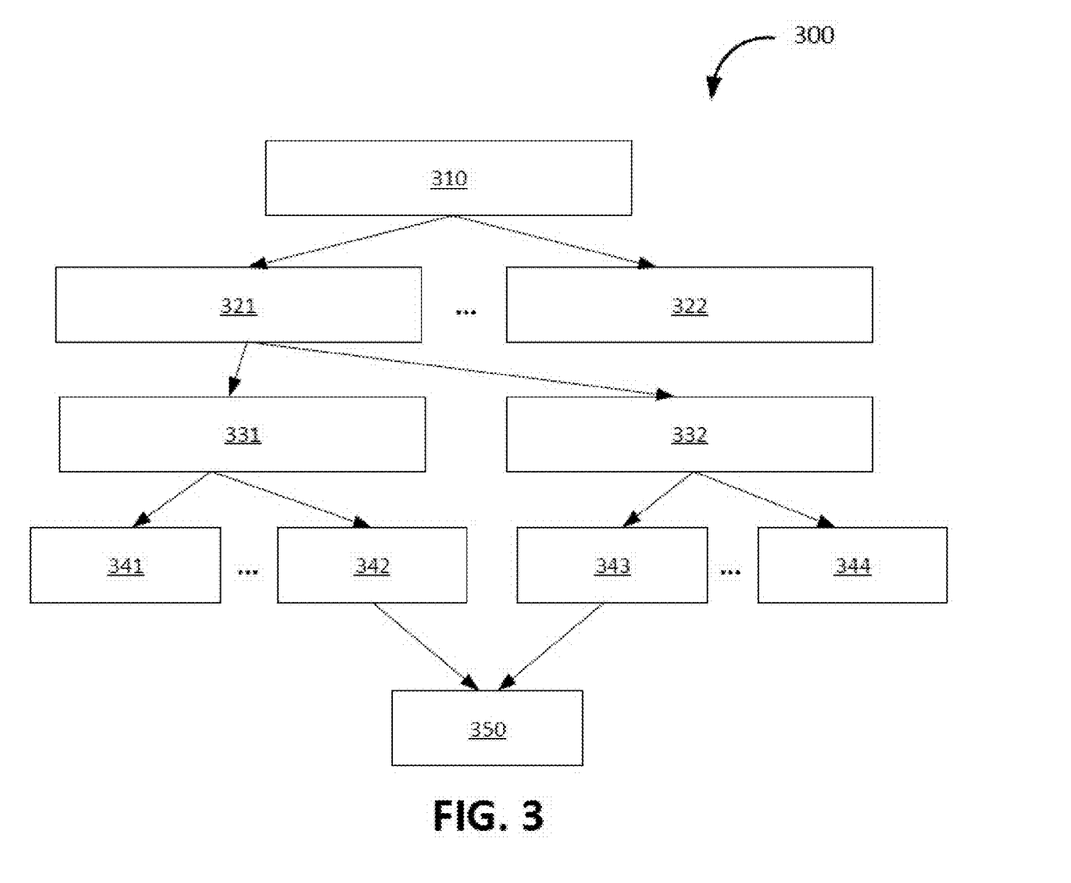
FIG. 3 is a flow chart of a detailed configuration method, according to various embodiments.

For CSI measurement associated to a reporting setting CSI-ReportConfig for NCJT, the UE can be configured with Ks≥2 NZP CSI-Reference Signal (RS) resources in a CSI-RS resource set for Channel Measurement Resource (CMR), and N≥1 NZP CSI-RS resource pairs whereas each pair is used for a NCJT measurement hypothesis. UE can be configured with two CMR groups with Ks=K1+K2 CMRs. In some embodiments, CMR pairs can be determined from the two groups of CMR according to the method shown in FIG. 3. FIG. 3 is a flow chart of a detailed configuration method 300, which begins with a Resource Setting 310. From there, the method 300 proceeds to a first Resource Set 321 or a second Resource Set 322. Although FIG. 3 shows only two Resource Sets (i.e., 321-322), any number of Resource Sets may be included (e.g., S resource sets). The first Resource Set corresponds to a first CMR group 331 and a second CMR group 332. The first CMR group 331 includes a first CMR 341 and a second CMR 342, while the second CMR group 332 includes a third CMR 343 and a fourth CMR 344. Although FIG. 3 shows only 4 CMRs (i.e., 341-344), any number of CMRs may be included (e.g., K1 or K2 CMRs). A CMR pair 350 is then chosen from the CMRs 341-344.

As used herein, the term 'beam' is used to describe QCL state, Transmission Configuration Indicator (TCI) state, spatial relation state (also known as a spatial relation information state), RS, spatial filter, or pre-coding. In particular, 'Transmission (Tx) beam' may also refer to QCL state, TCI state, spatial relation state, DL/UL reference signal (e.g., CSI-RS), Synchronization Signal Block (SSB) (e.g., Synchronization Signal-Physical Broadcast Channel (SS-PBCH)), Demodulation Reference Signal (DMRS), Sounding Reference Signal (SRS), and Physical Random Access Channel (PRACH), Tx spatial filter or Tx precoding. 'Reception (Rx)' beam may also refer to QCL state, TCI state, spatial relation state, spatial filter, Rx spatial filter, or Rx precoding. 'Beam ID' may also refer to QCL state index, TCI state index, spatial relation state index, RS index, spatial filter index, or precoding index. Specifically, the spatial filter can be either UE-side or gNB-side, and the spatial filter may also refer to the spatial-domain filter.

'Spatial relation information' may include one or more reference RSs, which is used to represent spatial relation between targeted RS/channel and the one or more reference RS. 'Spatial relation' here means the same/quasi-co beam(s), same/quasi-co spatial parameter(s), or the same/quasi-co spatial domain filter(s), and can also refer to the beam, spatial parameter, or spatial domain filter. QCL state includes one or more reference RSs and their corresponding QCL-type parameters, which include at least one of: a) Doppler spread; b) Doppler shift; c) delay spread; d) average delay; e) average gain; or f) spatial parameter (also referred to as spatial Rx parameter). Furthermore, 'TCI state' may also refer to 'QCL state.' QCL-TypeA' can refer to Doppler shift, Doppler spread, average delay, or delay spread. 'QCL-TypeB' can refer to Doppler shift or Doppler spread. 'QCL-TypeC' can refer to Doppler shift or average delay. 'QCL-TypeD' can refer to a spatial Rx parameter.

UL signaling can be a Physical Random Access Channel (PRACH), Physical Uplink Control Channel (PUCCH), Physical Uplink Shared Channel (PUSCH), UL DMRS, or SRS. DL signaling can be a Physical Downlink Control Channel (PDCCH), Physical Downlink Shared Channel (PDSCH), SSB, DL DMRS, or CSI-RS. Group based reporting comprises at least one of beam group-based reporting or antenna group-based reporting. A beam group, from a UE perspective, includes different Tx beam within a group that can be simultaneously received and transmitted, and/or Tx beams between different groups may not be simultaneously received and transmitted. A Beam Management Reference Signal (BM RS) can be a CSI-RS, SSB, or SRS, and a BM RS group is a grouping of one or more BM RS that are associated with the same TRP. The TRP index may include a TRP ID, which is used to distinguish different TRPs. A panel ID may also refer to a UE panel index.

In current technologies, the UE indicates the number of supported simultaneous CSI calculations as $N_{CPU}$. If a UE supports $N_{CPU}$ simultaneously CSI calculations, the UE is said to have $N_{CPU}$ CSI Processing Units (CPUs) for processing CSI reports across all configured cells. If L CPUs are occupied for calculation of CSI reports in a given Orthogonal Frequency Division Multiplexing (OFDM) symbol, the UE has $N_{CPU}$-L unoccupied CPUs. If N CSI reports occupy their respective CPUs, $O_{CPU}^{(n)}$ (n=0, . . . , N−1), on some OFDM symbols with $N_{CPU}$-L unoccupied CPUs, the UE only updates the M requested CSI reports with the highest priority. Here, M is defined as the largest value that satisfied the formula:

$$\Sigma_{n=0}^{M-1} O_{CPU}^{(n)} \leq N_{CPU}-L$$

In a first embodiment, if N CSI resource sets can be configured in a resource setting for the UE (for N≥2) and each resource set is associated with a TRP, then processing of a CSI report occupies a number of CPUs for a number of symbols that can be calculated for all resource sets. If a CSI report is configured with higher layer parameter reportQuantity set to 'none,' then at least one of: a) all resource sets in the resource setting associated with the CSI report with high layer parameter trs-Info configured, and the CSI report occupies 0 CPUs on some OFDM symbols (i.e., $O_{CPU}$=0); or b) M of N resource sets in the resource setting associated with the CSI report with higher layer parameters trs-Info are not configured, and the CSI report occupies M CPUs on some OFDM symbols (i.e., $O_{CPU}$=M. If a CSI report is configured with higher layer parameter reportQuantity set to at least one of 'cri-RSRP', 'ssb-Index-RSRP', 'cri-SINR', or 'ssb-Index-SINR,' then the CSI report occupies 1 CPU on some OFDM symbols (i.e., $O_{CPU}$=1).

If a CSI report is configured with higher layer parameter reportQuantity set to at least one of 'cri-RI-PMI-CQI', 'cri-RI-i1', 'cri-RI-i1-CQI', 'cri-RI-CQI', or 'cri-RI-LI-PMI-CQI,' and if a CSI report is aperiodically triggered and meets a particular requirement, the CSI report occupies $N_{CPU}$ CPUs on some OFDM symbols (i.e., $O_{CPU}$=$N_{CPU}$). In some embodiments, the particular requirement refers to a CSI report that is aperiodically triggered without transmitting a PUSCH with either transport block or Hybrid Automatic Repeat Request Acknowledgement (HARQ-ACK) or both when L=0 CPUs are occupied. Here, the CSI corresponds to a single CSI with wideband frequency-granularity and to at most 4 CSI-RS ports in a single resource with a CSI report. Furthermore, the parameter codebookType is set to to 'typeI-SinglePanel' or the parameter reportQuantity is set to 'cri-RI-CQI.' Alternatively, if the CSI report is periodic, semi-persistent or aperiodic and not meeting the particular requirement, the CSI report occupies $K_S$ CPUs on some OFDM symbols (i.e., $O_{CPU}$=$K_S$). $K_S$ is the number of CSI-RS resources in all CSI-RS resource sets in the resource setting associated with the CSI report configured for UE for channel measurement.

If N resource sets can be configured for the UE (for N≥2) and each resource set is associated with a TRP, the CPUs are occupied for a number of OFDM symbols that are enhanced according to at least one of the following methods. For a CSI report that is configured with higher layer parameter reportQuantity not set to 'none,' a periodic or semi-persistent CSI report occupies CPUs from the first symbol of the earliest one of CSI-RS/CSI-Interference Measurement (IM)/SSB resources in all of the resource sets for channel or interference measurement until the last symbol of the configured PUSCH/PUCCH carrying the report. Here, the CSI-RS/CSI-IM/SSB occasion should be earlier than the CSI reference resource corresponding to each TRP (resource set), wherein the semi-persistent CSI report excludes an initial semi-persistent CSI report on PUSCH after the PDCCH that triggered the report.

For an aperiodic CSI report with the higher layer parameter reportQuantity not set to 'none' and for single-DCI MTRP, the CSI report occupies CPUs from the first symbol after the PDCCH triggering the CSI report until the last symbol of the scheduled PUSCH carrying the report. For multi-DCI MTRP, the CSI report occupies CPUs from the first symbol after the earliest PDCCH triggering the CSI report until the last symbol of the scheduled PUSCH carrying the report. For an initial semi-persistent CSI report on PUSCH with the higher layer parameter reportQuantity not set to 'none' and for a single-DCI MTRP, the CSI report occupies CPUs from the first symbol after the PDCCH triggering the CSI report until the last symbol of the scheduled PUSCH carrying the report. For a multi-DCI MTRP, the CSI report occupies CPUs from the first symbol after the earliest PDCCH triggering the CSI report until the last symbol of the scheduled PUSCH carrying the report.

For a CSI report that is configured with higher layer parameter reportQuantity set to 'none' and at least one CSI-RS resource set with higher layer parameter trs-Info is not configured, the CPUs are occupied for a number OFDM symbols determined according to at least one of the following scenarios. A semi-persistent CSI report occupies CPUs from the first symbol of the earliest one of each CSI-RS/SSB resource in the resource set (excluding configured parameter trs-Info) for channel measurement for L1-RSRP computation, until $Z'_3$ symbols after the last symbol of the latest one of the CSI-RS/SSB resource in the resource set (excluding configured parameter trs-Info) for channel measurement. The semi-persistent CSI report excludes the initial semi-persistent CSI report on PUSCH after the PDCCH that triggered the report.

For an aperiodic CSI report and initial semi-persistent CSI report, with a single-DCI MTRP, the CSI report occupies CPUs from the first symbol after the PDCCH triggering the CSI report until the last symbol between $Z_3$ symbols after the first symbol after the PDCCH triggering the CSI report and $Z'_3$ symbols after the last symbol of the latest one of CSI-RS/SSB resources in the resource set (excluding configured parameter trs-Info) for channel measurement. With a multi-DCI MTRP, the CSI report occupies CPUs from the first symbol after the earliest PDCCH triggering the CSI report until the last symbol between $Z_3$ symbols after the first symbol after the earliest PDCCH triggering the CSI report and $Z'_3$ symbols after the last symbol of the latest one of CSI-RS/SSB resources in the resource set (excluding configured parameter trs-Info) for channel measurement. In some embodiments, various values for Z (e.g., $Z_3$, $Z'_3$) which represent a CSI computation delay, can be determined according to the following Table 1.

| | $Z_1$ [symbols] | | $Z_2$ [symbols] | | $Z_3$ [symbols] | |
|---|---|---|---|---|---|---|
| μ | $Z_1$ | $Z'_1$ | $Z_2$ | $Z'_2$ | $Z_3$ | $Z'_3$ |
| 0 | 22 | 16 | 40 | 37 | 22 | X0 |
| 1 | 33 | 30 | 72 | 69 | 33 | X1 |
| 2 | 44 | 42 | 141 | 140 | min(44, $X_2$ + $KB_1$) | X2 |
| 3 | 97 | 85 | 152 | 140 | min(97, $X_3$ + $KB_2$) | X3 |

If N resource sets can be configured for the UE (where N≥2) and each resource set is associated with a TRP, the number of CPUs occupied by processing the CSI report can be calculated for each resource set (each TRP). If a CSI report is configured with higher layer parameter reportQuantity set to 'none, and: a) when one resource set in the resource setting associated the CSI report with higher layer parameter trs-Info is configured, then a part of the CSI report occupies 0 CPUs on the OFDM symbol corresponding to the resource set (i.e., $O_{CPU}$=0); or b) when one resource set in the resource setting associated the CSI report with higher layer parameter trs-Info not configured, then a part of the CSI report occupies 1 CPU on the OFDM symbol corresponding to the resource set (i.e., $O_{CPU}$=1).

Figure 4:
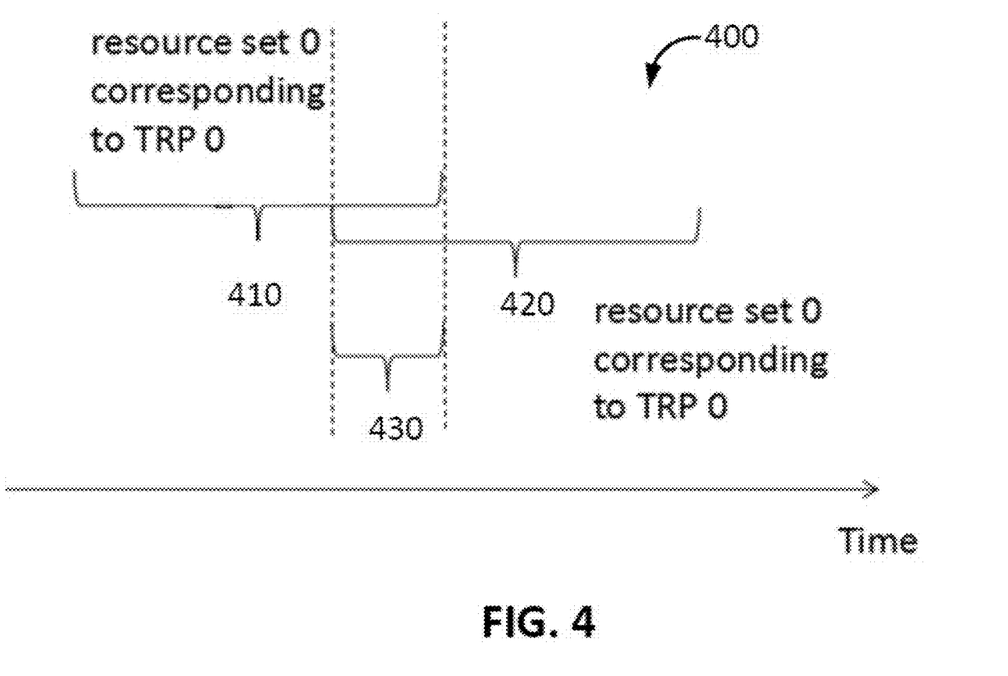
FIG. 4 is an example for calculating channel station information processing units by each resource set, according to various embodiments.

FIG. 4 is an example for calculating CPUs by each resource set, according to various embodiments. As shown in FIG. 4, resource set 0 is configured with higher layer parameter trs-Info, and resource set 1 is not configured. For resource set 0 (i.e., TRP0) the CSI report will occupy 0 CPU at 410, and for a resource set 2 (i.e., TRP1) the CSI report will occupy 1 CPU at 420. In total, the CSI report will occupy 1 CPU at 430, which is the overlapping area for 410 and 420.

If a CSI report with CSI-ReportConfig with higher layer parameter reportQuantity set to 'cri-RSRP', 'ssb-Index-RSRP', 'cri-SINR', or 'ssb-Index-SINR', then the CSI report occupies 1 CPU on the OFDM symbol for each resource set (i.e., $O_{CPU}$=1). If a CSI report with CSI-ReportConfig with higher layer parameter reportQuantity set to 'cri-RI-PMI-CQI', 'cri-RI-i1', 'cri-RI-i1-CQI', 'cri-RI-CQI', or 'cri-RI-LI-PMI-CQI', and a) if a CSI report is aperiodically triggered and meets a particular requirement, then the CSI report occupies $N_{CPU}$/N CPU on the OFDM symbol for each resource set (i.e., $O_{CPU}$=$N_{CPU}$ IN), or the CSI report occupies A*$N_{CPU}$/B) CPUs for one resource set, where B is the number of all resources in all resource sets combined and A is the number of all resources in the corresponding resource set. For example, a resource set P may configured with p resources and a resource set Q may be configured with q resources, such that the number of occupied CPUs for resource set P is equal to p*$N_{CPU}$/(q+p); or b) otherwise, the CSI report occupies $K_S$ CPU on the OFDM symbol determined by the corresponding resource set (i.e., $O_{CPU}$=$K_S$), where $K_S$ is the number of CSI-RS resources in corresponding CSI-RS resource set configured for UE for channel measurement. In some embodiments, the particular requirement refers to a CSI report that is aperiodically triggered without transmitting a PUSCH with either transport block or HARQ-ACK or both when L=0 CPUs are occupied, and the CSI corresponding to a single CSI with wideband frequency-granularity and to at most 4 CSI-RS ports in a single resource without CRI report, with at least one of higher layer parameter a) codebookType set to 'typeI-SinglePanel'; or b) reportQuantity is set to 'cri-RI-CQI'.

In a second embodiment, if N resource sets can be configured for the UE (where N≥2) and each resource set is associated with a TRP, the number of symbols occupied for processing a CSI report can be calculated for each resource set (TRP). For a CSI report with CSI-ReportConfig with higher layer parameter reportQuantity not set to 'none': a) with a periodic or semi-persistent CSI report occupies CPUs determined by each resource, for one resource set, the CSI report occupies CPUs from the first symbol of the earliest one of CSI-RS/CSI-IM/SSB resources in the CSI resource set for channel or interference measurement until the last symbol of the configured PUSCH/PUCCH carrying the report. The CSI-RS/CSI-IM/SSB occasion should be earlier than the CSI reference resource corresponding to each TRP (or resource set), wherein the semi-persistent CSI report excludes an initial semi-persistent CSI report on PUSCH after the PDCCH triggering the report; b) with an aperiodic CSI report, with a single-DCI MTRP, the CSI report for one resource set occupies CPUs from the first symbol after the PDCCH triggering the CSI report until the last symbol of the scheduled PUSCH carrying the report. With a multi-DCI MTRP, the CSI report occupies CPUs determined for each resource set. For one resource set, the CSI reports occupies CPUs from the first symbol after the PDCCH corresponding to the resource set triggering the CSI report until the last symbol of the scheduled PUSCH carrying the report; and c) with an initial semi-persistent CSI report on PUSCH, for a single-DCI MTRP, the CSI report occupies CPUs from the first symbol after the PDCCH triggering the CSI report until the last symbol of the scheduled PUSCH carrying the report. For a multi-DCI MTRP, the CSI report occupies CPUs determined for each resource set. For a resource set, the CSI report occupies CPUs from the first symbol after the PDCCH corresponding to the resource set triggering the CSI report until the last symbol of the scheduled PUSCH carrying the report.

For a CSI report with CSI-ReportConfig having the higher layer parameter reportQuantity set to 'none' and at least one CSI-RS-ResourceSet with higher layer parameter trs-Info being unconfigured, the UE calculates the symbols and the number of CPUs occupied for a number of OFDM symbols according to one of the following: a) a semi-persistent CSI report occupies CPUs from the first symbol of the earliest one of CSI-RS/SSB resources in the corresponding resource set (which is not configured parameter trs-Info) for channel measurement until $Z'_3$ symbols after the last symbol of the latest CSI-RS/SSB resource in the resource set for channel measurement. The semi-persistent CSI report here excludes an initial semi-persistent CSI report on PUSCH after the PDCCH triggering the report; b) an aperiodic CSI report or initial semi-persistent CSI report occupies CPUs determined by each resource set. With single-DCI MTRP, the CSI report occupies CPUs from the first symbol after the PDCCH triggering the CSI report until the last symbol between $Z_3$ symbols after the first symbol after the PDCCH that triggered the CSI report and $Z'_3$ symbols after the last symbol of latest of CSI-RS/SSB resources in corresponding resource set for channel measurement. With multi-DCI MTRP, the CSI report occupies CPUs determined for each resource set. For a resource set, the CSI report occupies CPUs from the first symbol after the PDCCH corresponding to the resource set triggering the CSI report until the last symbol between $Z_3$ symbols after the first symbol and $Z'_3$ symbols after the last symbol of the latest of CSI-RS/SSB resources in the corresponding set for channel measurement. Here, the number of occupied CPUs is the sum of the number of occupied CPUs on the overlapping symbols.

Figure 5:
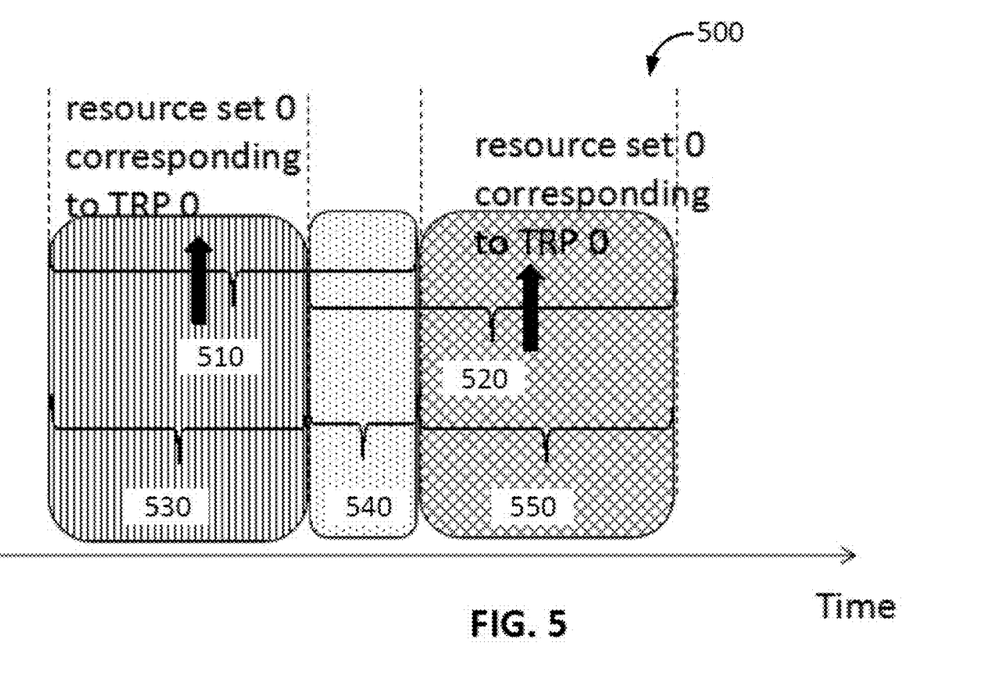
FIG. 5 is an example for calculating occupied symbols by each resource set, according to various embodiments.

FIG. 5 is an example for calculating occupied symbols by each resource set, according to various embodiments. As shown in FIG. 5, resource set 0 corresponds to TRP0, and resource set 1 corresponds to TRP1. For TRP0, the CSI report occupies n CPUs in 510, and for TRP1, the CSI report occupies m CPUs in 520. As such, the CSI report will occupy n CPUs in 530, n+m CPUs in 540 (as the overlap of 510 and 520), and m CPUs in 550.

In current technologies, when the CSI request field on a DCI triggers a CSI report(s) on PUSCH, the UE provides a valid CSI report for the nth triggered report if a) the first UL symbol to carry the corresponding CSI report(s) (including the effect of the timing advance) starts no earlier than $Z_{ref}$, and b) the first UL symbol to carry the nth CSI report (including the effect of the timing advance) starts no earlier than at $Z'_{ref}(n)$. In a third embodiment, if N resource sets can be configured for the UE (for N≥2) and if each resource set is associated with a TRP, the definition of $Z'_{ref}(n)$ needs to be enhanced. $Z'_{ref}(n)$ is defined as the next UL symbol after the end of the last symbol in time of the latest of: a) an aperiodic CSI-RS resource for channel measurements configured in N resource sets: b) an aperiodic CSI-IM used for interference measurements in N resource sets; or c) an aperiodic Non-Zero Power (NZP) CSI-RS for interference measurement in N resource sets.

Figure 6A:
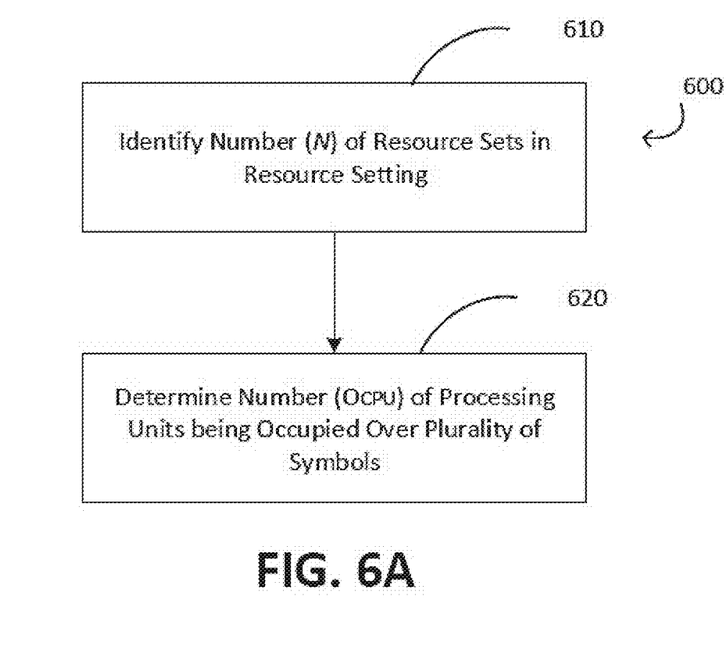
FIG. 6A is a flowchart diagram illustrating an example wireless communication method for measurement of resources in downlink positioning, according to various embodiments.

FIG. 6A is a flowchart diagram illustrating an example wireless communication method 600, according to various arrangements. Method 600 can be performed by a User Equipment (UE), and begins at 610 where the UE identifies a number (N) of resource sets in a resource setting, with N being greater than or equal to 2. At 620, the UE determines a number ($O_{CPU}$) of processing units being occupied over a plurality of symbols. The occupied process units are configured for processing a Channel State Information (CSI) report.

In some embodiments, the N resource sets are associated with N Transmission-Reception Points (TRPs). In other embodiments, the method 600 further includes determining the number of occupied processing units ($O_{CPU}$) for all N resource sets. In some of these embodiments, the method 600 further comprises identifying that a parameter (reportQuantity) configured in the CSI report is set to none and that all of the N resource sets are configured with another parameter (trs-Info), and then determining $O_{CPU}$ as 0. In other of these embodiments, the method 600 further comprises identifying that a parameter (reportQuantity) configured in the CSI report is set to none and that M of the N resource sets are not configured with another parameter (trs-Info), and then determining $O_{CPU}$ as M.

In some of these embodiments, the method 600 further comprises identifying that a parameter (reportQuantity) configured in the CSI report is set to cri-RSRP, ssb-Index-RSRP, cri-SINR, or ssb-Index-SINR, and then determining $O_{CPU}$ as 1. In other of these embodiments, the method 600 further comprises identifying that a parameter (reportQuantity) configured in the CSI report is set to cri-RI-PMI-CQI, cri-RI-i1, cri-RI-i1-CQI, cri-RI-CQI, or cri-RI-LI-PMI-CQI, determining that the CSI report is aperiodically triggered and a pre-defined condition is met, and then determining $O_{CPU}$ as $N_{CPU}$. $N_{CPU}$ here represents a number of simultaneous CSI calculations that the UE supports. In further of these embodiments, the method 600 further comprises identifying that a parameter (reportQuantity) configured in the CSI report is set to cri-RI-PMI-CQI, cri-RI-i1-CQI, cri-RI-i1-CQI, cri-RI-CQI, or cri-RI-LI-PMI-CQI, determining that the CSI report is at least one of: a) semi-persistent; b) periodic; or c) aperiodic and not meeting a pre-defined condition, and then determining $O_{CPU}$ as $K_S$. $K_S$ here represents a number of CSI-RS resources in all of the N resource sets that are associated with the CSI report for channel measurements.

In some of these embodiments, the method 600 further comprises identifying that a parameter (reportQuantity) configured in the CSI report is set to none, determining that the plurality of symbols extend from a first symbol of an earliest one among a CSI-RS resource, a CSI-IM resource, and an SSB resource in all of the N resource sets associated with the CSI report to a last symbol of a configured PUSCH/PUCCH carrying the CSI report. The CSI report here is periodic or semi-persistent and is exclusive from an initial semi-persistent CSI report on a PUSCH after a PDCCH triggering the CSI report. In some of these embodiments, an occasion of each of the CSI-RS resource, CSI-IM resource, and SSB resource should be earlier than a CSI reference resource corresponding to each of the N resource sets.

In some of these embodiments, the method 600 further comprises identifying that a parameter (reportQuantity) configured in the CSI report is set to none, and determining, when only one PDCCH can trigger the CSI report, that the plurality of symbols extend from a first symbol after a PDCCH triggering the CSI report to a last symbol of a scheduled PUSCH carrying the CSI report. The CSI report here is aperiodic. In other of these embodiments, the method 600 further comprises identifying that a parameter (reportQuantity) configured in the CSI report is set to none, and determining, when multiple PDCCHs can trigger the same CSI report, that the plurality of symbols extend from a first symbol after an earliest PDCCH triggering the CSI report to a last symbol of a scheduled PUSCH carrying the CSI report. The CSI report here is aperiodic.

In some of these embodiments, the method 600 further comprises identifying that a parameter (reportQuantity) configured in the CSI report is set to none, and determining, when only one PDCCH can trigger the CSI report, that the plurality of symbols extend from a first symbol after a PDCCH triggering the CSI report to a last symbol of a scheduled PUSCH carrying the CSI report. The CSI report here is semi-persistent on the scheduled PUSCH. In other of these embodiments, the method 600 further comprises identifying that a parameter (reportQuantay) configured in the CSI report is set to none, and determining, when multiple PDCCHs can trigger the same CSI report, that the plurality of symbols extend from a first symbol after an earliest PDCCH triggering the CSI report to a last symbol of a scheduled PUSCH carrying the CSI report. The CSI report here is semi-persistent on the scheduled PUSCH.

In some of these embodiments, the method 600 further comprises identifying that a parameter (reportQuantay) configured in the CSI report is set to none and at least one of the N resource sets is not configured with a parameter (trs-Info), and determining that the plurality of symbols extend from a first symbol of an earliest one among CSI-RS/SSB resources in the at least one resource set not configured with the parameter (trs-Info) to $Z'_3$ symbols after a last symbol of the CSI-RS/SSB resource in the at least one resource set not configured with the parameter (trs-Info). The CSI report here is semi-persistent and is exclusive from an initial semi-persistent CSI report on a PUSCH after a PDCCH triggering the CSI report.

In other of these embodiments, the method 600 further comprises identifying that a parameter (reportQuantay) configured in the CSI report is set to none and at least one of the N resource sets is not configured with a parameter (trs-Info), and determining, when multiple PDCCHs can trigger the same CSI report, that the plurality of symbols extend from a first symbol after a PDCCH triggering the CSI report to a later symbol between $Z_3$ symbols after the first symbol and $Z'_3$ symbols after a last symbol of a latest of a CSI-RS/SSB resource in the at least one resource set not configured with the parameter (trs-Info) for channel measurements for L1-RSRP computation. The CSI report here is aperiodic.

In some embodiments, the method 600 further comprises identifying that a parameter (reportQuantity) configured in the CSI report is set to none and at least one of the N resource sets is not configured with a parameter (trs-Info), and determining, when only one PDCCH can trigger the CSI report, that the plurality of symbols extend from a first symbol after a PDCCH triggering the CSI report to a later symbol between $Z_3$ symbols after the first symbol and $Z'_3$ symbols after a last symbol of a latest of a CSI-RS/SSB resource in the at least one resource set not configured with the parameter (Irs-Info) for channel measurements for L1-RSRP computation. The CSI report here is aperiodic.

In some embodiments, the method 600 further comprises determining a number of occupied processing units for each of the N resource sets. In some of these embodiments, the method 600 further comprises identifying that a parameter (reportQuantity) configured in the CSI report is set to none and that all of the N resource sets are configured with another parameter (trs-Info), and then determining $O_{CPU}$ as 0. In other of these embodiments, the method 600 further comprises identifying that a parameter (reportQuantity) configured in the CSI report is set to none and that one of the N resource sets is not configured with another parameter (trs-Info), and then determining $O_{CPU}$ as 1.

In some of these embodiments, the method 600 further comprises identifying that a parameter (reportQuantity) configured in the CSI report is set to cri-RSRP, ssb-Index-RSRP, cri-SINR, or ssb-Index-SINR, and then determining $O_{CPU}$ as 1. In other of these embodiments, the method 600 further comprises identifying that a parameter (reportQuantity) configured in the CSI report is set to cri-RI-PMI-CQI, cri-RI-i1, cri-RI-i1-CQI, cri-RI-CQI, or cri-RI-LI-PMI-CQI, determining that the CSI report is aperiodically triggered and a pre-defined condition is met, and then determining $O_{CPU}$ as $N_{CPU}$. $N_{CPU}$ here represents a number of simultaneous CSI calculations that the UE supports. In further of these embodiments, the method 600 further comprises identifying that a parameter (reportQuantity) configured in the CSI report is set to cri-RI-PMI-CQI, cri-RI-i1, cri-RI-i1-CQI, cri-RI-CQI, or cri-RI-LI-PMI-CQI, determining that the CSI report is aperiodically triggered and a pre-defined condition is met, and then determining $O_{CPU}$ as $N_{CPU}/B \times A$. B here is a number of resources in all of the N resource sets, A here is a number of resources in the resource set, and $N_{CPU}$ represents a number of simultaneous CSI calculations that the wireless communication device supports.

In some of these embodiments, the method 600 further comprises identifying that a parameter (reportQuantity) configured in the CSI report is set to cri-RI-PMI-CQI, cri-RI-i1, cri-RI-i1-CQI, cri-RI-CQI, or cri-RI-LI-PMI-CQI, determining that the CSI report is not aperiodically triggered and a pre-defined condition is not met, and then determining $K_S$. $K_S$ here represents a number of CSI-RS resources in the resource set that is associated with the CSI report for channel measurements. In other of these embodiments, the method 600 further comprises identifying that a parameter (reportQuantity) configured in the CSI report is set to none, determining that the plurality of symbols, for one of the N resource sets, extend from a first symbol of an earliest one among a CSI-RS resource, a CSI-IM resource, and an SSB resource in a corresponding resource set to a last symbol of a configured PUSCH/PUCCH carrying the CSI report. The CSI report here is periodic or semi-persistent and is exclusive from an initial semi-persistent CSI report on a PUSCH after a PDCCH triggering the CSI report. In some of these embodiments, an occasion of each of the CSI-RS resource, CSI-IM resource, and SSB resource should be earlier than a CSI reference resource corresponding to each of the N resource sets.

In some of these embodiments, the method 600 further comprises identifying that a parameter (reportQuantity) configured in the CSI report is not set to none, and determining, when only one PDCCH can trigger the CSI report, that the plurality of symbols extend from a first symbol after a PDCCH triggering the CSI report to a last symbol of a scheduled PUSCH carrying the CSI report. The CSI report here is initially semi-persistent on the scheduled PUSCH. In other of these embodiments, the method 600 further comprises identifying that a parameter (reportQuantity) configured in the CSI report is not set to none, and determining, when multiple PDCCHs can trigger the same CSI report, that the plurality of symbols extend from a first symbol after a PDCCH that corresponds to the resource set triggering the CSI report to a last symbol of a scheduled PUSCH carrying the CSI report. The CSI report here is initially semi-persistent on the scheduled PUSCH.

In some of these embodiments, the method 600 further comprises identifying that a parameter (reportQuantity) configured in the CSI report is set to none, and determining, when only one PDCCH can trigger the CSI report, that the plurality of symbols extend from a first symbol after a PDCCH triggering the CSI report to a last symbol of a scheduled PUSCH carrying the CSI report. The CSI report here is semi-persistent on the scheduled PUSCH. In other of these embodiments, the method 600 further comprises identifying that a parameter (reportQuantity) configured in the CSI report is set to none, and determining, when multiple PDCCHs can trigger the same CSI report, that the plurality of symbols extend from a first symbol after an earliest PDCCH triggering the CSI report to a last symbol of a scheduled PUSCH carrying the CSI report. The CSI report here is semi-persistent on the scheduled PUSCH.

In some of these embodiments, the method 600 further comprises identifying that a parameter (reportQuantity) configured in the CSI report is set to none and at least one of the N resource sets is not configured with a parameter (trs-Info), and determining that the plurality of symbols extend from a first symbol of an earliest one among CSI-RS/SSB resources in the resource set to $Z'_3$ symbols after a last symbol of the CSI-RS/SSB resource in the resource set. The CSI report here is semi-persistent and exclusive from an initial semi-persistent CSI report on a PUSCH after a PDCCH triggering the CSI report.

In other of these embodiments, the method 600 further comprises identifying that a parameter (reportQuantity) configured in the CSI report is set to none and at least one of the N resource sets is not configured with a parameter (trs-Info), and determining, when multiple PDCCHs can trigger the same CSI report, that the plurality of symbols extend from a first symbol after a PDCCH triggering the CSI report to a later symbol between $Z_3$ symbols after the first symbol and $Z'_3$ symbols after a last symbol of a latest of a CSI-RS/SSB resource in the at least one resource set not configured with the parameter (trs-Info) for channel measurements for L1-RSRP computation. The CSI report here is aperiodic.

In some of these embodiments, the method 600 further comprises identifying that a parameter (reportQuantny) configured in the CSI report is set to none and at least one of the N resource sets is not configured with a parameter (trs-Info), and determining, when multiple PDCCHs can trigger the same CSI report, that the plurality of symbols, for one resource set not configured with the parameter (trs-Info), extend from a first symbol after a PDCCH corresponding to the resource set triggering the CSI report to a later symbol between $Z_3$ symbols after the first symbol and $Z'_3$ symbols after a last symbol of a latest of a CSI-RS/SSB resource in the resource set for channel measurements for L1-RSRP computation. The CSI report here is aperiodic.

In any of these embodiments, the method 600 further includes determining $O_{CPU}$ for all of the N resource sets in the CSI-report by combining $O_{CPU}$ for each of the N resource sets on one or more of the plurality of symbols overlapped to each other. In some embodiments, the method 600 further includes determining $Z'_{ref}(n)$ as a next UL symbol after an end of a last symbol of the latest of: a) aperiodic CSI-RS resources configured for channel measurements configured in the N resource sets; b) aperiodic CSI-IM resources configured for interference measurements in the N resource sets; or c) and aperiodic NZP CSI-RS resources configured for interference measurements in the N resource sets.

Figure 6B:
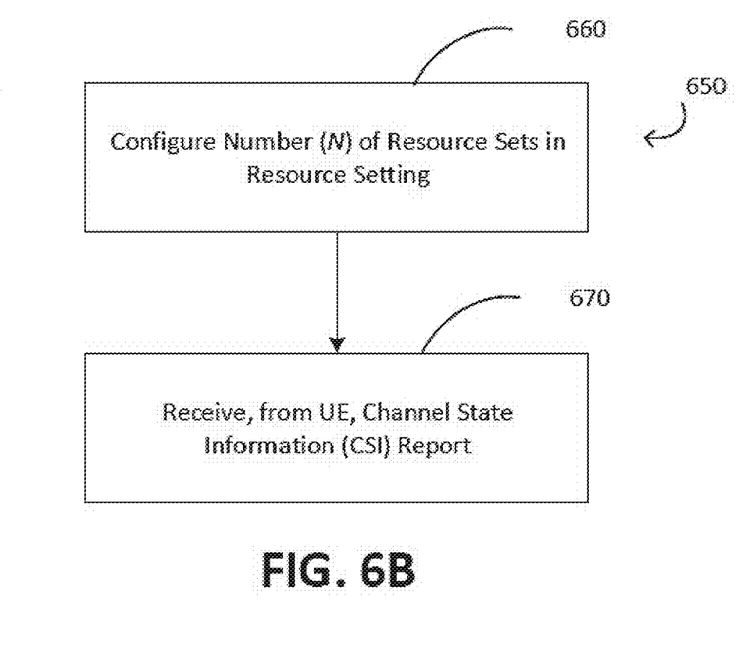
FIG. 6B is a flowchart diagram illustrating another example wireless communication method for measurement of resources in downlink positioning, according to various embodiments.

FIG. 6B is a flowchart diagram illustrating an example wireless communication method 650, according to various arrangements. Method 650 can be performed by BS, and begins at 660 where the BS configures a number (N) of resource sets in a resource setting, wherein N is greater than or equal to 2. At 670, the BS receives, from a UE, a Channel State Information (CSI) report. The CSI report is processed by a number ($O_{CPU}$) of processing units being occupied over a plurality of symbols.

While various embodiments of the present solution have been described above, it should be understood that they have been presented by way of example only, and not by way of limitation. Likewise, the various diagrams may depict an example architectural or configuration, which are provided to enable persons of ordinary skill in the art to understand example features and functions of the present solution. Such persons would understand, however, that the solution is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described illustrative embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software module), or any combination of these techniques.

To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the present solution.

Additionally, memory or other storage, as well as communication components, may be employed in embodiments of the present solution. It will be appreciated that, for clarity purposes, the above description has described embodiments of the present solution with reference to different functional units and processors. However, it will be apparent that any suitable distribution of functionality between different functional units, processing logic elements or domains may be used without detracting from the present solution. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the implementations described in this disclosure will be readily apparent to those skilled in the art, and the general principles defined herein can be applied to other implementations without departing from the scope of this disclosure. Thus, the disclosure is not intended to be limited to the implementations shown herein, but is to be accorded the widest scope consistent with the novel features and principles disclosed herein, as recited in the claims below.

The invention claimed is:

1. A wireless communication method, comprising:
identifying, by a wireless communication device, a number (N) of resource sets in a resource setting, wherein N is equal to or greater than 2, wherein the resource sets comprise Channel State Information (CSI) resource sets and the resource setting is associated with CSI reporting;
identifying, by the wireless communication device, a parameter reportQuantity, configured in a CSI report; and
determining, by the wireless communication device, a number ($O_{CPU}$) of processing units being occupied over a plurality of symbols according to the reportQuantity, wherein the occupied processing units are configured for processing the CSI report.

2. The method of claim 1, wherein the N resource sets are associated with N Transmission-Reception Points (TRPs).

3. The method of claim 1, further comprising:
determining, by the wireless communication device, $O_{CPU}$ for all of the N resource sets.

4. The method of claim 3, further comprising:
identifying, by the wireless communication device, that the parameter reportQuantity configured in the CSI report is set to none;
identifying, by the wireless communication device, that all of the N resource sets are configured with a parameter (trs-Info); and
determining, by the wireless communication device, $O_{CPU}$ as 0.

5. The method of claim 3, further comprising:
identifying, by the wireless communication device, that the parameter reportQuantity configured in the CSI report is set to none;
identifying, by the wireless communication device, that M of the N resource sets are not configured with a parameter (trs-Info); and
determining, by the wireless communication device, $O_{CPU}$ as M.

6. The method of claim 3, further comprising:
identifying, by the wireless communication device, that the parameter reportQuantity configured in the CSI report is set to one of: CSI-Reference Signal (CSI-RS) Resource Indicator (cri)-Reference Signal Received Power (RSRP), Syncrhonization Signal Block (ssb)-Index-RSRP, cri-Signal-to-Interference-plus-Noise Ratio (SINR), or ssb-Index-SINR; and
determining, by the wireless communication device, $O_{CPU}$ as 1.

7. The method of claim 3, further comprising:
identifying, by the wireless communication device, that the parameter reportQuantity configured in the CSI report is set to one of: CSI-Reference Signal (CSI-RS) Resource Indicator (cri)-Rank Indicator (RI)-Precoding Matrix Indicator (PMI)-Channel Quality Indicator (CQI), cri-RI-i1, cri-RI-i1-CQI, cri-RI-CQI, or cri-RI-Layer Indicator (LI)-PMI-CQI;

determining, by the wireless communication device, that the CSI report is aperiodically triggered and a predefined condition is met; and determining, by the wireless communication device, $O_{CPU}$ as $N_{CPU}$, wherein $N_{CPU}$ represents a number of simultaneous CSI calculations that the wireless communication device supports.

8. The method of claim 3, further comprising:

identifying, by the wireless communication device, that the parameter reportQuantity configured in the CSI report is set to one of: CSI-Reference Signal (CSI-RS) Resource Indicator (cri)-Rank Indicator (RI)-Precoding Matrix Indicator (PMI)-Channel Quality Indicator (CQI), cri-RI-i1, cri-RI-i1-CQI, cri-RI-CQI, or cri-RI-Layer Indicator (LI)-PMI-CQI;

determining, by the wireless communication device, that the CSI report is one of:
semi-persistent,
periodic, or
aperiodic and not meeting a predefined condition; and determining, by the wireless communication device, $O_{CPU}$ as $K_S$, wherein $K_S$ represents a number of CSI-RS resources in all of the N resource sets that are associated with the CSI report for channel measurements.

9. The method of claim 3, further comprising:

identifying, by the wireless communication device, that the parameter reportQuantity configured in the CSI report is not set to none; and determining, by the wireless communication device, that the plurality of symbols extend from a first symbol of an earliest one among a CSI-Reference Signal (RS) resource, a CSI-Interference Measurement (IM) resource, and an synchronization signal block (SSB) resource in all of the N resource sets associated with the CSI report to a last symbol of a configured Physical Uplink Shared Channel (PUSCH)/Physical Uplink Control Channel (PUCCH) carrying the CSI report;

wherein the CSI report is periodic or semi-persistent and exclusive from an initial semi-persistent CSI report on a PUSCH after a Physical Downlink Control Channel (PDCCH) triggering the CSI report.

10. The method of claim 9, wherein an occasion of each of the CSI-RS resource, CSI-IM resource, and SSB resource should be earlier than a CSI reference resource corresponding to each of the N resource sets.

11. The method of claim 3, further comprising:

identifying, by the wireless communication device, that the parameter reportQuantity configured in the CSI report is not set to none; and determining, by the wireless communication device, when only one Physical Downlink Control Channel (PDCCH) can trigger the CSI report, that the plurality of symbols extend from a first symbol after a PDCCH triggering the CSI report to a last symbol of a scheduled Physical Uplink Shared Channel (PUSCH) carrying the CSI report;

wherein the CSI report is aperiodic.

12. The method of claim 3, further comprising:

identifying, by the wireless communication device, that the parameter reportQuantity configured in the CSI report is not set to none; and determining, by the wireless communication device, when multiple Physical Downlink Control Channels (PDCCHs) can trigger the same CSI report, that the plurality of symbols extend from a first symbol after an earliest PDCCH triggering the CSI report to a last symbol of a scheduled Physical Uplink Shared Channel (PUSCH) carrying the CSI report;

wherein the CSI report is aperiodic.

13. The method of claim 3, further comprising:

identifying, by the wireless communication device, that the parameter reportQuantity configured in the CSI report is not set to none; and determining, by the wireless communication device, when only one Physical Downlink Control Channel (PDCCH) can trigger the CSI report, that the plurality of symbols extend from a first symbol after a PDCCH triggering the CSI report to a last symbol of a scheduled Physical Uplink Shared Channel (PUSCH) carrying the CSI report;

wherein the CSI report is initially semi-persistent on the scheduled PUSCH.

14. The method of claim 3, further comprising:

identifying, by the wireless communication device, that the parameter reportQuantity configured in the CSI report is not set to none; and determining, by the wireless communication device, when multiple Physical Downlink Control Channels (PDCCHs) can trigger the same CSI report, that the plurality of symbols extend from a first symbol after an earliest PDCCH triggering the CSI report to a last symbol of a scheduled Physical Uplink Shared Channel (PUSCH) carrying the CSI report;

wherein the CSI report is initially semi-persistent on the scheduled PUSCH.

15. The method of claim 3, further comprising:

identifying, by the wireless communication device, that the parameter reportQuantity configured in the CSI report is set to none, and at least one of the N resource sets is not configured with a parameter (trs-Info); and determining, by the wireless communication device, that the plurality of symbols extend from a first symbol of an earliest one among CSI-Reference Signal (RS)/Synchronization Signal Block (SSB) resource in the at least one resource set not configured with a parameter (trs-Info) to $Z'_3$ symbols after a last symbol of the CSI-RS/SSB resource in the at least one resource set not configured with the parameter (trs-Info);

wherein the CSI report is semi-persistent and exclusive from an initial semi-persistent CSI report on a Physical Uplink Shared Channel (PUSCH) after a Physical Downlink Control Channel (PDCCH) triggering the CSI report.

16. The method of claim 3, further comprising:

identifying, by the wireless communication device, that the parameter reportQuantity configured in the CSI report is set to none, and at least one of the N resource sets is not configured with a parameter (trs-Info); and determining, by the wireless communication device, when multiple Physical Downlink Control Channels (PDCCHs) can trigger the same CSI report, that the plurality of symbols extend from a first symbol after an earliest PDCCH triggering the CSI report to a later symbol between $Z_3$ symbols after the first symbol and $Z'_3$ symbols after a last symbol of a latest of a CSI-Reference Signal (RS)/Synchronization Signal Block (SSB) resource in the at least one of the N resource sets not configured with the parameter (trs-Info) for channel measurements for L1-Reference Signal Received Power (RSRP) computation;

wherein the CSI report is one of:
  aperiodic, or
  initial semi-persistent.
17. The method of claim 1, further comprising:
  identifying, by the wireless communication device, that the parameter reportQuantity configured in the CSI report is set to none, and at least one of the N resource sets is not configured with a parameter (trs-Info); and
  determining, by the wireless communication device, when only one Physical Downlink Control Channel (PDCCH) can trigger the CSI report, that the plurality of symbols extend from a first symbol after a PDCCH triggering the CSI report to a later symbol between $Z_3$ symbols after the first symbol and $Z'_3$ symbols after a last symbol of a latest of a CSI-Reference Signal (RS)/Synchronization Signal Block (SSB) resource in the at least one of the N resource sets not configured with the parameter (trs-Info) for channel measurements for L1-Reference Signal Received Power (RSRP) computation,
wherein the CSI report is one of:
  aperiodic, or
  initial semi-persistent.
18. A wireless communication method, comprising:
  configuring, by a wireless communication node, a number (N) of resource sets in a resource setting, wherein N is equal to or greater than 2, wherein the resource sets comprise Channel State Information (CSI) resource sets and the resource setting is associated with CSI reporting; and
  receiving, by the wireless communication node from a wireless communication device, a CSI report, wherein the CSI report is processed by a number ($O_{CPU}$) of processing units being occupied over a plurality of symbols, wherein the number of $O_{CPU}$ of processing units is determined according to a parameter reportQuantity, configured in the CSI report.
19. A wireless communication device, comprising:
  at least one processor configured to:
    identify a number (N) of resource sets in a resource setting, wherein N is equal to or greater than 2, wherein the resource sets comprise Channel State Information, CSI, resource sets and the resource setting is associated with CSI reporting;
    identify a parameter reportQuantity, configured in a CSI report; and
    determine a number ($O_{CPU}$) of processing units being occupied over a plurality of symbols according to the reportQuantity, wherein the occupied processing units are configured for processing the CSI report.
20. A wireless communication node, comprising:
  at least one processor configured to:
    configure a number (N) of resource sets in a resource setting, wherein N is equal to or greater than 2, wherein the resource sets comprise Channel State Information, CSI, resource sets and the resource setting is associated with CSI reporting; and
    receive, via the receiver from a wireless communication device, a CSI report, wherein the CSI report is processed by a number ($O_{CPU}$) of processing units being occupied over a plurality of symbols, wherein the number $O_{CPU}$ of processing units is determined according to a parameter reportQuantity, configured in the CSI report.

* * * * *